United States Patent [19]

Yokogawa

[11] 4,214,211
[45] Jul. 22, 1980

[54] ELECTROSTATIC DESTRUCTION PREVENTING CIRCUIT FOR USE IN A RECEIVER

[75] Inventor: Tomohisa Yokogawa, Kawagoe, Japan

[73] Assignee: Pioneer Electronic Corporation, Tokyo, Japan

[21] Appl. No.: 917,041

[22] Filed: Jun. 19, 1978

[30] Foreign Application Priority Data

Jun. 22, 1977 [JP] Japan .................................. 52-74247

[51] Int. Cl.$^2$ ............................................. H04B 1/10
[52] U.S. Cl. .................................... 455/287; 455/296
[58] Field of Search ................. 325/380, 65, 473, 474, 325/477

[56] References Cited

U.S. PATENT DOCUMENTS

| | | | |
|---|---|---|---|
| 1,968,817 | 8/1934 | Crawford | 325/380 |
| 1,971,762 | 8/1934 | Alexanderson | 325/380 |
| 3,571,719 | 3/1971 | Beary | 325/380 |
| 3,656,062 | 4/1972 | Wlasuk | 325/380 |

*Primary Examiner*—Douglas W. Olms
*Attorney, Agent, or Firm*—Sughrue, Rothwell, Mion, Zinn and Macpeak

[57] ABSTRACT

In an electrostatic destruction preventing circuit employed in a receiver, a capacitor is connected between an antenna terminal and the primary winding of a high frequency transformer, and a spark gap discharge element is connected in parallel to the capacitor to thereby absorb static electricity applied to the antenna terminal.

3 Claims, 3 Drawing Figures

ELECTROSTATIC DESTRUCTION PREVENTING CIRCUIT FOR USE IN A RECEIVER

BACKGROUND OF THE INVENTION

This invention relates to a receiver, and more particularly to a circuit for preventing the destruction of a first stage transistor due to static electricity.

An antenna adapted to be drawn out or an antenna terminal is typically provided in an AM or FM receiver. When a strong electrostatic field is applied to the antenna or the antenna terminal due to lightning or static electricity owing to vehicles, etc., the first stage transistor is sometimes electrostatically destroyed. This phenomenon is particularly notable when an FET (field effect transistor) is employed as the first stage transistor.

In an attempt to solve the aforementioned problem, a spark gap discharge element, such as neon lamp, has been connected between the antenna terminal and ground. Such a device, however, is not satisfactory because the electrostatic destruction cannot be prevented without fail. Furthermore, such a device is disadvantageous in terms of cost an compactness.

SUMMARY OF THE INVENTION

Accordingly, an object of this invention is to eliminate the aforementioned disadvantages. Briefly, in this invention a capacitor is connected between an antenna terminal and the primary winding of a high frequency transformer, and a spark gap discharge element is connected in parallel to the capacitor to thereby absorb static electricity applied to the antenna terminal. The thus constructed electrostatic destruction preventing circuit provides excellent results in preventing the destruction of the first stage transistor.

DETAILED DESCRIPTION OF THE INVENTION

Figure 1:
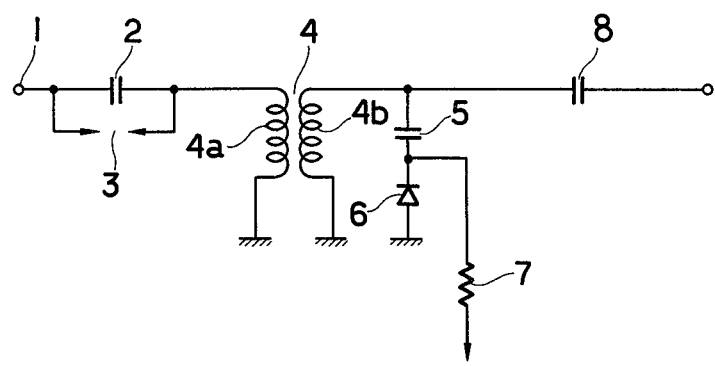
FIG. 1 is a circuit diagram showing the electrostatic destruction preventing circuit according to this invention.

This invention will now be described with reference to the accompanying drawings. In FIG. 1, reference numeral 1 designates an antenna terminal and reference numeral 2 designates a capacitor connected at one terminal to the antenna terminal 1 for preventing the attenuation of AM radio wave in the case that an antenna common to AM and FM is used. Reference numeral 3 designates a spark gap discharge element connected in parallel to the capacitor 2. Numeral 4 designates a high frequency transformer in which the primary winding 4a is connected between the capacitor 2 and ground, and serially connected capacitor 5 and voltage controllable varactor diode 6 are connected between the terminals of the secondary winding 4b. Reference numeral 7 designates a resistor for applying a tuning voltage to the varactor diode 6, and numeral 8 designates a capacitor for supplying the tuned output of the circuit to the first stage transistor (not shown).

Figures 2A, 2B:
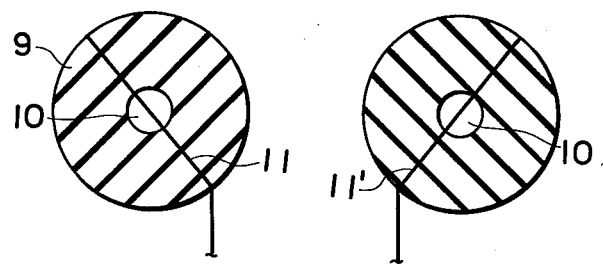
FIGS. 2(a) and 2(b) are cross-sectional views showing front and rear surfaces of an integrally formed capacitance and discharge element.

The thus constructed electronic tuning circuit can be further compacted if an integrally formed discharge element and capacitor is employed. One of such examples is illustrated by way of FIGS. 2(a) and 2(b), which are cross-sectional views showing front and rear surfaces of the integrally formed element, respectively. Reference numerals 11 and 11' designate a pair of lead wired affixed to the respective opposite surfaces of the element. The element includes a ceramic disc designated by reference numeral 9 and which corresponds to the capacitor 2 shown in FIG. 1, i.e. the ceramic disc 9 is the dielectric of the capacitor, and the wires 11, 11' are the plates of the capacitor. A hole 10 is concentrically formed relative to the disc 9 and the discharge of the static electricity will occur between the lead wires 11 and 11' in the center of the hole 10, i.e. hole 10 is the air gap of the spark gap discharge element whose electrodes are the wires 11, 11'. The diameters of the disc 9 and the hole 10 are typically 6.0 mm and 1.2 mm, respectively. The thickness of the element or the gap width of the discharge portion is typically 0.8 mm. With respect to the above-described element, various modifications are possible by, for example, forming a slit in the center of the ceramics disc in lieu of the hole 10.

The operation of the high frequency circuit of the receiver will be briefly described. The high frequency signal supplied from the antenna (not shown) flows into the primary winding 4a of the transformer 4 through the antenna terminal 1 and the capacitor 2. The high frequency curent flowing into the first winding 4a is induced in the secondary winding 4b. In this case, a resonance occurs with respect to a frequency determined by the capacitance $C_1$ of the capacitor 5, the capacitance $C_2$ of the varactor diode 6 determined by the tuning voltage applied to it by the resistor 7, and the inductance L of the secondary winding 4b. The resonance signal is applied to the first stage transistor through a capacitor 8 as a tuned frequency. Variation of the tuned frequency is carried out by controlling the capacitance of the varactor diode 6 owing to the tuning voltage applied to it by the resistor 7.

If, for some reason, relatively strong static electricity, caused by lightning etc., is applied to the antenna terminal 1, the energy due to the static electricity is absorbed into the capacitor 2 and the discharge element 3, whereby this energy is not supplied to the high frequency transformer 4 and the first stage transistor.

Under the condition that the gap width of the discharge element is 0.8 mm and the capacitance of the capacitor 2 is 15 pF, the first stage transistor is destroyed when approximately 3 to 5 KV static electricity is applied to the antenna terminal in the case of the conventional circuit construction. Under the same condition, the same is destroyed only when approximately 10 KV electrostatic electricity is applied thereto in the case of this invention. From this experimental result, it will be apparent that the circuit construction according to this invention provides an excellent result compared with the conventional circuit construction. According to repeated experiments, it has been confirmed that various kinds of static electricity applied to the antenna terminal are absorbed thereinto without fail.

What is claimed is:

1. In an electrostatic destruction preventing circuit for use in a receiver for receiving radio waves of AM and FM broadcastings of the type including an antenna input circuit and a spark-gap discharge element to an antenna terminal to prevent the electrostatic destruction of a first stage transistor in the receiver, the improvement characterized by a capacitor connected in series between the antenna terminal and said antenna input circuit and a spark-gap discharge element connected in parallel to said capacitor, whereby the electrostatic destruction of a first transistor of the receiver is prevented.

2. The improvement as claimed in claim 1 wherein said capacitor and said discharge element are integrally formed in a single circuit element.

3. The improvement as claimed in claim 1 wherein said single circuit element comprises:

a ceramic disk having a central opening therein; and first and second conductive wires on the opposite surfaces, respectively, of said disk and extending across said opening, wherein the dielectric of said capacitor is formed by said ceramic disk, and the plates of said capacitor are formed by said conductive wires, and wherein said spark gap discharge element is formed by said conductive wires and the air gap provided by said opening.

* * * * *